United States Patent
Schuld et al.

(10) Patent No.: US 8,342,449 B2
(45) Date of Patent: Jan. 1, 2013

(54) VERTICALLY MOVABLE PASSAGEWAY FOR REST ROOMS IN CEILING REGION

(75) Inventors: Michael Schuld, Hamburg (DE); Harry Kwik, Wentorf (DE)

(73) Assignee: Airbus Operations GmbH (DE)

( * ) Notice: Subject to any disclaimer, the term of this patent is extended or adjusted under 35 U.S.C. 154(b) by 776 days.

(21) Appl. No.: 12/083,758

(22) PCT Filed: Oct. 11, 2006

(86) PCT No.: PCT/EP2006/009821
§ 371 (c)(1),
(2), (4) Date: Sep. 17, 2009

(87) PCT Pub. No.: WO2007/042276
PCT Pub. Date: Apr. 19, 2007

(65) Prior Publication Data
US 2009/0321564 A1 Dec. 31, 2009

(30) Foreign Application Priority Data
Oct. 12, 2005 (DE) .......................... 10 2005 048 709

(51) Int. Cl.
*B64C 1/18* (2006.01)
(52) U.S. Cl. ................ 244/118.5; 244/118.1; 244/118.2; 244/119; 244/118.6
(58) Field of Classification Search ............... 244/118.5, 244/118.1, 118.2, 118.6, 119, 120
See application file for complete search history.

(56) References Cited

U.S. PATENT DOCUMENTS

| | | | |
|---|---|---|---|
| 1,958,234 A | | 5/1934 | Cleveland |
| 2,293,367 A | | 8/1942 | Stanton |
| 4,066,227 A | * | 1/1978 | Buchsel ................... 244/118.6 |
| 4,660,787 A | * | 4/1987 | Sprenger et al. .......... 244/118.5 |
| 6,073,883 A | * | 6/2000 | Ohlmann et al. ......... 244/118.5 |
| 6,182,926 B1 | * | 2/2001 | Moore ...................... 244/118.5 |
| 6,305,645 B1 | * | 10/2001 | Moore ...................... 244/118.5 |
| 6,464,169 B1 | * | 10/2002 | Johnson et al. ........... 244/118.5 |
| 6,581,876 B2 | | 6/2003 | Cheung |
| 6,848,654 B1 | * | 2/2005 | Mills et al. ................ 244/118.5 |
| 7,717,371 B2 | * | 5/2010 | Schuld et al. ............. 244/118.5 |
| 2005/0224646 A1 | * | 10/2005 | Mills ......................... 244/118.5 |

FOREIGN PATENT DOCUMENTS

| | | | |
|---|---|---|---|
| EP | 0901964 A2 | | 3/1999 |
| GB | 730969 | * | 6/1955 |
| GB | 2 169 256 A | | 7/1986 |
| GB | 2169256 A | * | 7/1986 |
| JP | 58162766 A | | 9/1983 |
| JP | 03091444 A | | 4/1991 |
| SU | 1037538 A2 | | 5/1988 |

* cited by examiner

*Primary Examiner* — Isam Alsomiri
*Assistant Examiner* — Justin Benedik
(74) *Attorney, Agent, or Firm* — Lerner, David, Littenberg, Krumholz & Mentlik, LLP

(57) ABSTRACT

A vertically movable passageway for a space in the ceiling region in an aircraft cabin. The passageway comprises a passageway floor and a displacement device, wherein the displacement device is designed to variably set the height (h1) of the passageway floor.

14 Claims, 5 Drawing Sheets

VERTICALLY MOVABLE PASSAGEWAY FOR REST ROOMS IN CEILING REGION

REFERENCE TO RELATED APPLICATIONS

This application claims the benefit of the filing date of German Patent Application No. 10 2005 048 709.2 filed Oct. 12, 2005, the disclosure of which is hereby incorporated herein by reference.

TECHNICAL FIELD

The present invention relates to a vertically movable passageway, to a method for setting the height of a passageway, to an aircraft comprising such a passageway, and to the use of the passageway in an aircraft.

BACKGROUND TO THE INVENTION

In modern aircraft, in the fuselages that are becoming increasingly large, several levels can be used. However, as a result of the narrow radii in the upper fuselage region, any use that is comfortable to passengers is extremely difficult because, in line with the average stature of aircraft passengers, adequate passageway height must be ensured so that passengers can move along the passageway comfortably or upright. For this reason, often solutions are found wherein the passengers have, for example, the opportunity to sleep, or have access to additional stowage space, in the upper region of an aircraft region, but can only access the aforesaid with difficulty.

In existing solutions for using the upper region of an aircraft fuselage for passengers, the height of the upper and of the lower passageways is defined such that narrow, uncomfortable and low passageway options for passengers in the upper and the lower passageway region are provided. In order to reach the different levels, ladders or stairs are provided at particular distances.

In this context, U.S. Pat. No. 4,066,227 and U.S. Pat. No. 6,305,645 disclose, for example, solutions involving a mezzanine floor in large volume aircraft. These show clearly that due to the confined space a compromise has to be made in that in the region of the passageway of the upper deck in the region of the middle deck a fixed wall is installed. In this way, in the middle deck, due to the space requirements of the passageway in the upper deck, the options for using the region of the middle deck that is situated below said passageway are foregone.

U.S. Pat. No. 6,073,883 discloses an option for using the upper region of a fuselage as a room for sleeping and resting. In this arrangement, adequate height of the passageway is achieved in that in the middle deck only seats are installed so that the passageway of the upper deck can be installed right down to head height. In this way a passageway height can be achieved in which the passenger can take advantage of the options to use the space in the upper deck at least when stooped.

U.S. Pat. No. 6,182,926 and U.S. Pat. No. 6,581,876 disclose usage options in an upper deck of an aircraft, wherein for example a retractable and extendable ladder can be affixed which provides access to certain regions, for example to rest areas for the aircrew.

PRESENTATION OF THE INVENTION

It is an object of the present invention to create a passageway that provides adequate freedom of movement.

According to an exemplary embodiment of the invention, a vertically movable passageway for a space in the ceiling region in an aircraft cabin is provided. In this arrangement the passageway comprises a passageway floor and a displacement device, wherein said displacement device is arranged to variably set the height of the passageway floor.

According to another exemplary embodiment of the invention, a method for the variable setting of the height of the passageway floor for a space in the ceiling region in an aircraft cabin is provided. In this arrangement, the method comprises the step of setting a first height of the passageway floor by means of a displacement device, wherein the first height provides adequate or sufficient standing height above the passageway floor.

According to yet another exemplary embodiment, an aircraft with a vertically movable passageway for a space in the ceiling region in an aircraft cabin according to the above-described characteristics is claimed.

According to another exemplary embodiment, a vertically movable passageway for a space in the ceiling region in an aircraft cabin, with the features described above is used in an aircraft.

The present invention makes it possible, in cabins with little in the way of reserve space, by means of putting in place a movable passageway, to create an additional upper passageway in a fuselage. Such a movable passageway provides adequate passageway height for passengers to move comfortably or upright along the passageway. In this way novel options of using the upper region of an aircraft are created and thus the level of service and convenience offered to passengers is improved. In addition, with the above, for example during the boarding phase or the deplaning phase, an additional aisle between the seat rows in the main level can be created by raising the movable upper passageway, while during the flight the upper passageway can be lowered so that it becomes more comfortable to move in an upper deck. It is imaginable that an upper deck is, for example, used for rooms for sleeping in, additional bars, children's play areas etc.

Below, embodiments of the vertically movable passageway are described, wherein the described embodiments also apply to the method, to the use of the passageway, and to the aircraft.

In a further exemplary embodiment, the height of the passageway between an upper position and a lower position can be set, wherein the lower position provides access to the ceiling region with adequate standing height in the ceiling region. In this arrangement the upper position provides adequate standing height below the passageway floor. As already mentioned above, it thus becomes possible to flexibly react to various flight states or operational states of the plane. During the boarding or deplaning phase, to receive passengers more quickly or for passengers to leave the aircraft more quickly, the passageway according to the invention can be set to an upper position, so that on a lower level adequate standing height is created so that on said lower level an additional aisle for passengers is created. In contrast to this, in flight, there is usually a lesser need for an aisle on the middle level of a fuselage, because passengers generally remain in their seats. Therefore, in an upper deck, without major loss of quality, in an upper region a passageway that provides adequate standing height in the ceiling region can be provided, in that a passageway is flexibly displaced into a lower position. In this way, during a flight, significantly better usage options in an upper region of an aircraft fuselage can be created.

In a further exemplary embodiment the displacement device comprises a first guide element, a second guide element and a guide rail. In this arrangement the first guide element and/or the second guide element are/is firmly connected to the movable passageway floor and are/is designed such that both can be moved along the guide rail. This exemplary embodiment shows just one option of providing a displacement device for a passageway. For example, the guide elements, too, can represent an elevation, with said guide elements projecting into the guide rail, thus being guidable, and an option is shown of inserting a displacement device in a simple and lightweight concept that saves material.

In a further exemplary embodiment, the guide rail is arranged so as to be perpendicular in relation to the cabin floor. Thus a vertical or perpendicular displacement device in relation to the cabin floor is provided.

According to a further exemplary embodiment of the present invention, the guide rail also serves as a retainer for an upper deck in the ceiling region. Apart from its function in a displacement device the guide rail can also retain a further upper ceiling section or a rest room. In this arrangement, for example, transverse supports of the upper ceiling region are fastened to the guide rail by means of fasteners. With this combination of the functions of the guide rail, it becomes possible to do without further material and further installation parts, thus again saving costs and weight.

In a further exemplary embodiment of the present invention, the guide rail is attached to a primary structure of the aircraft. In this document the term "primary structure" refers, for example, to the outer skin of the aircraft or to the fuselage. By attaching the guide rail directly to a primary structure of an aircraft, there is no need to provide further attachment devices, such as for example attachment rails etc., thus saving weight and costs.

According to a further exemplary embodiment, the passageway further comprises a first wall arrangement and a second wall arrangement. In this setup the first wall arrangement and the second wall arrangement can be attached to the aircraft floor. With the additional first and second wall arrangements, for example, passenger comfort is further enhanced because a privacy screen between the first level and the second level is created. In particular in the case of rest rooms in the upper region it is often advantageous to provide a privacy screen between the levels so as to provide privacy for passengers.

Other types of privacy screens can also be provided, for example screens or blinds. A wall may improve the stability of the device.

According to a further exemplary embodiment, the passageway further comprises a drive unit. The drive unit is designed to move the displacement device. In a further exemplary embodiment the passageway further comprises a drive unit, wherein this drive unit is designed to move the first guide element and the second guide element along the guide rail. In this arrangement the drive unit can be designed so as to be electric, pneumatic or hydraulic. One option consists of displacing the passageway to an upper and to the lower position by means of cable pull arrangements. Moreover, the guide elements can comprise rollers that are movable along the guide rail and that are driven by the drive unit.

In a further exemplary embodiment of the present invention the passageway further comprises a ladder element that can be attached to the passageway. In this arrangement the ladder element is arranged such that the passageway can be connected to a main cabin aisle that is situated underneath said passageway. In this arrangement the ladder element can be connected at several different positions in longitudinal direction of a fuselage so that several access options to an upper fuselage region are made possible.

In a further exemplary embodiment of the present invention, the ladder element is arranged such that it is retractable and extendable. With this ability of the ladder element to be retracted and extended it is thus possible to flexibly save space and to optimize the connection between an upper passageway and a lower aisle.

In a further exemplary embodiment of the present invention, the passageway is arranged such that the ceiling region can be reached from the main cabin aisle. In this arrangement the ceiling region can comprise an element from the group comprising stowage compartment areas, sleeping areas, lounge areas, children's play areas, gastronomy areas and bar areas.

In a further exemplary embodiment of the method, in a step of setting the height of the passageway, the first and/or the second guide element are/is moved along a guide rail together with the passageway floor.

BRIEF DESCRIPTION OF THE DRAWINGS

Below, for further explanation and to provide a better understanding of the present invention, exemplary embodiments are described in more detail with reference to the enclosed drawings. The following are shown.

DETAILED DESCRIPTION OF EXEMPLARY EMBODIMENTS

Figure 1:
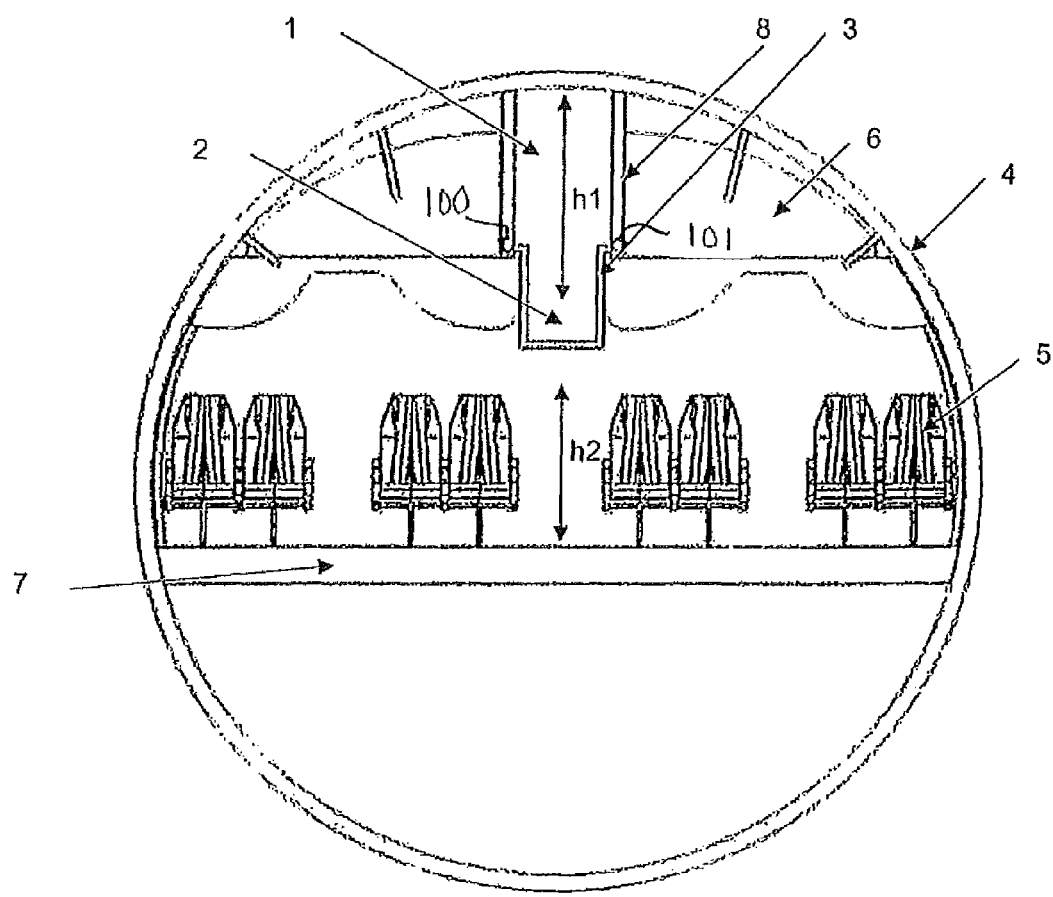
FIG. 1 a diagrammatic cross-sectional view of a fuselage comprising a movable passageway in a lower position.

Identical or similar components in different figures have the same reference characters.

FIG. 1 shows a vertically movable passageway 1 for a space in the ceiling region 6 of an aircraft cabin 4. In this arrangement the passageway 1 comprises a passageway floor 2 and a displacement device, wherein the displacement device is arranged for the variable setting of a height h1 of the passageway floor 2.

Of course other seating combinations are also possible, e.g. the passageway according to the invention can also be used in the case of a 2×4 or 2×3 arrangement.

FIG. 1 further shows a complete cross-sectional view of a fuselage 4 with a mid plane 7 and a ceiling region 6. The configuration of the seats 5 is shown in a 4×2 arrangement. The passageway floor 2 according to the invention is shown in a lower position (h1>h2) above a middle aisle of the mid plane 7 of the fuselage.

In the lower position, as shown in FIG. 1, of the passageway 1, the height h1 provides adequate passageway height (standing height; i.e. enough height and room and headroom for a person to walk in an upright position) for a passenger of average stature so that said-passenger can move upright in the direction of the longitudinal axis of the aircraft. At the same time, the height h2 of the middle aisle of the mid plane 7 is lower so that a passenger might only be able to move along in a stooped position; this provides, however, significantly more space for the passengers seated on the middle seats. This is made possible in that the two outer aisles in the mid plane 7 need to be less wide when compared to conventional cabin layouts because in cases of emergency the middle aisle can also be used so that safety regulations are complied with despite the lower aisle height h2 of the middle aisle.

According to an embodiment of the invention, irrespective of the position of the third (movable) passageway, the aisle widths and stand-up heights in the aisles of the main deck comply with FAA (Federal Aviation Administration) and JAA (Joint Aviation Authorities) safety regulations.

Furthermore, FIG. 1 shows the first and the second wall arrangements 3 of the passageway 1, which wall arrangements are connected to the passageway floor 2. It is thus not possible to see into the passageway region and thus into the ceiling region from the mid plane 7.

Moreover, FIG. 1 shows the attachment rail 8 of the passageway. By means of the attachment rail 8 the passageway can simply be attached to a primary structure, for example to the outer skin or to the frame of the fuselage 4. This obviates the need for additional retaining structures that generate weight.

Figure 2:
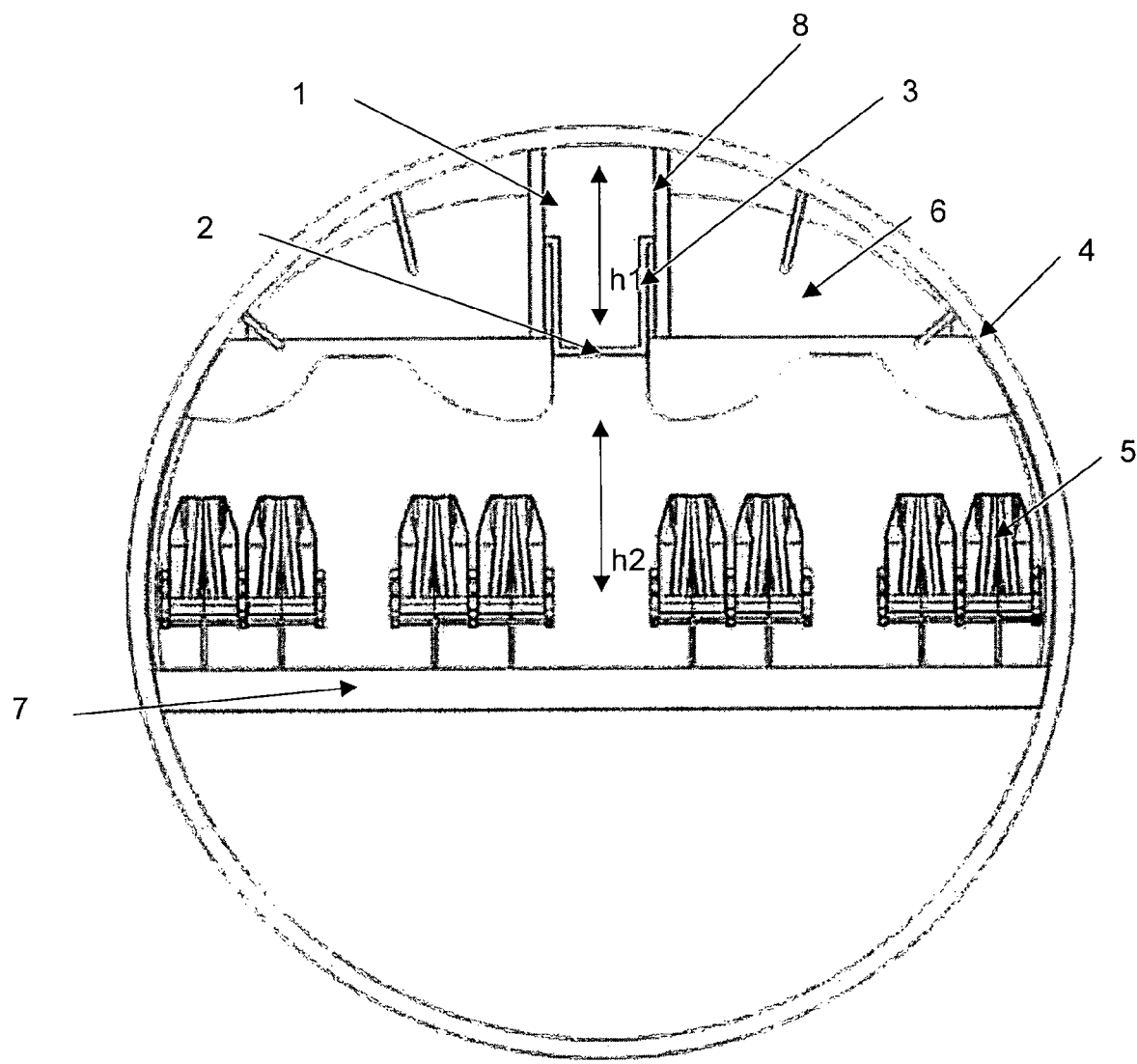
FIG. 2 a diagrammatic cross-sectional view of a fuselage comprising a movable passageway in an upper position.

FIG. 2 shows a cross-sectional view of a fuselage, in which the aircraft-passageway according to an exemplary embodiment of the invention is shown in an upper position (h2>h1). The height h2 of the passageway in the mid plane is at least equivalent to the height of a passenger of average stature so that now in the middle aisle, too, passengers can comfortably move in longitudinal direction of the fuselage. Accordingly the height h1 can be less than the average stature of a passenger so that a passenger can move along only in a stooped position. In these layouts with an aircraft passageway 1 in an upper position (h2>h1), for example when the aircraft is at the airport (boarding phase, deplaning phase), passengers can leave the aircraft cabin significantly faster, and conversely they can board the aircraft and be seated significantly faster. In this way, for example, the turnaround time of an aircraft can be significantly shortened, which results in a reduction in costs.

Figure 3:
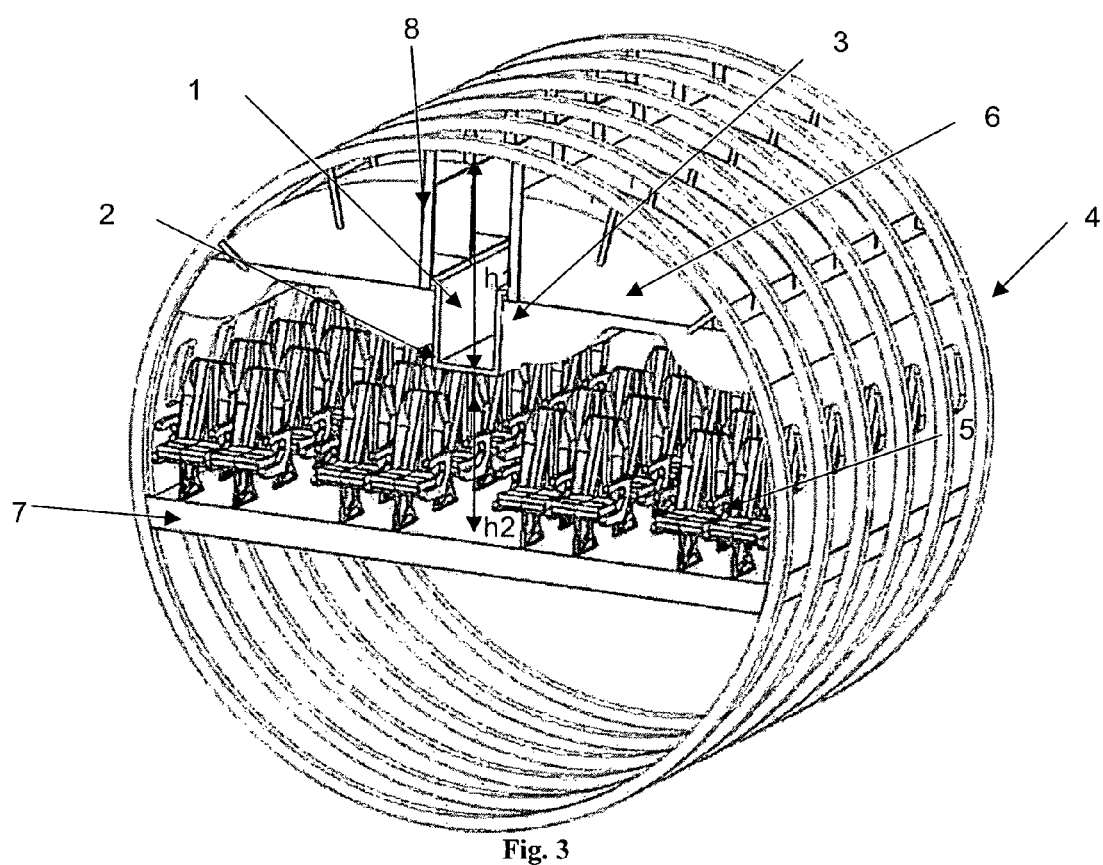
FIG. 3 a three-dimensional view of a fuselage with a passageway arrangement in a lower position.

FIG. 3 shows a three-dimensional view of a fuselage 4 with an aircraft passageway 1 which is in a lower position (h1>h2). Again, the height h1 is such that in the upper deck region passengers can move along the longitudinal axis of the aircraft without having to stoop. In this arrangement, the regions in the ceiling region 6 are sleeping cabins in which passengers can sleep or rest during a flight. The wall arrangements 3 provide a privacy screen between the upper deck 6 and the lower deck 7, thus significantly enhancing the comfort of the resting persons in the upper deck region 6. The arrangement of the aircraft seats 5 also shows that when compared to a conventional 2-4-2 layout, the passengers in the middle seat row enjoy significantly improved comfort and freedom of movement during the flight as a result of the 2-2-2-2 layout shown.

Figure 4:
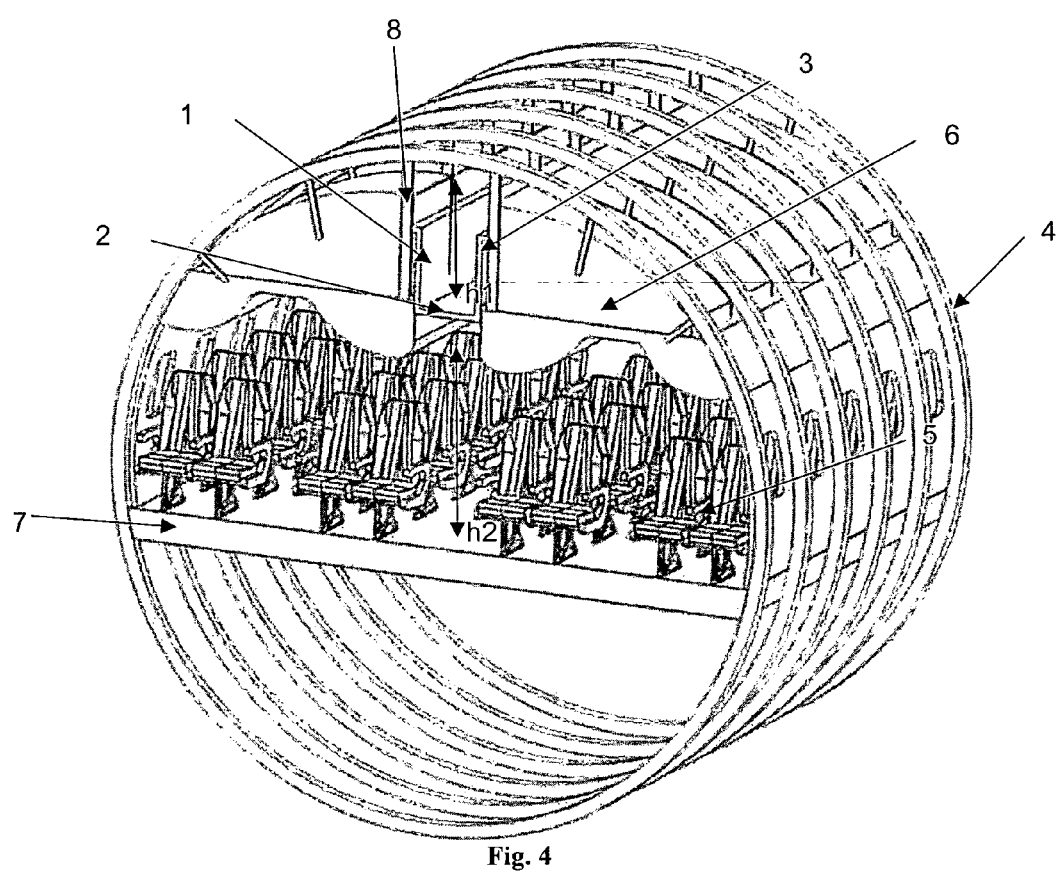
FIG. 4 a three-dimensional view of a fuselage with an aircraft passageway in an upper position.

FIG. 4 shows a three-dimensional view of the aircraft cross section 4, in which the movable aircraft passageway 1 is arranged in an upper position (h2>h1). Again, the diagram clearly shows that only the middle aisle of the mid plane 7 at a height of h2 is used as a normal through-aisle so that in that aisle passengers can move along the fuselage without having to stoop. As already mentioned above, in this way turnaround times on airports can be significantly reduced.

Figure 5:
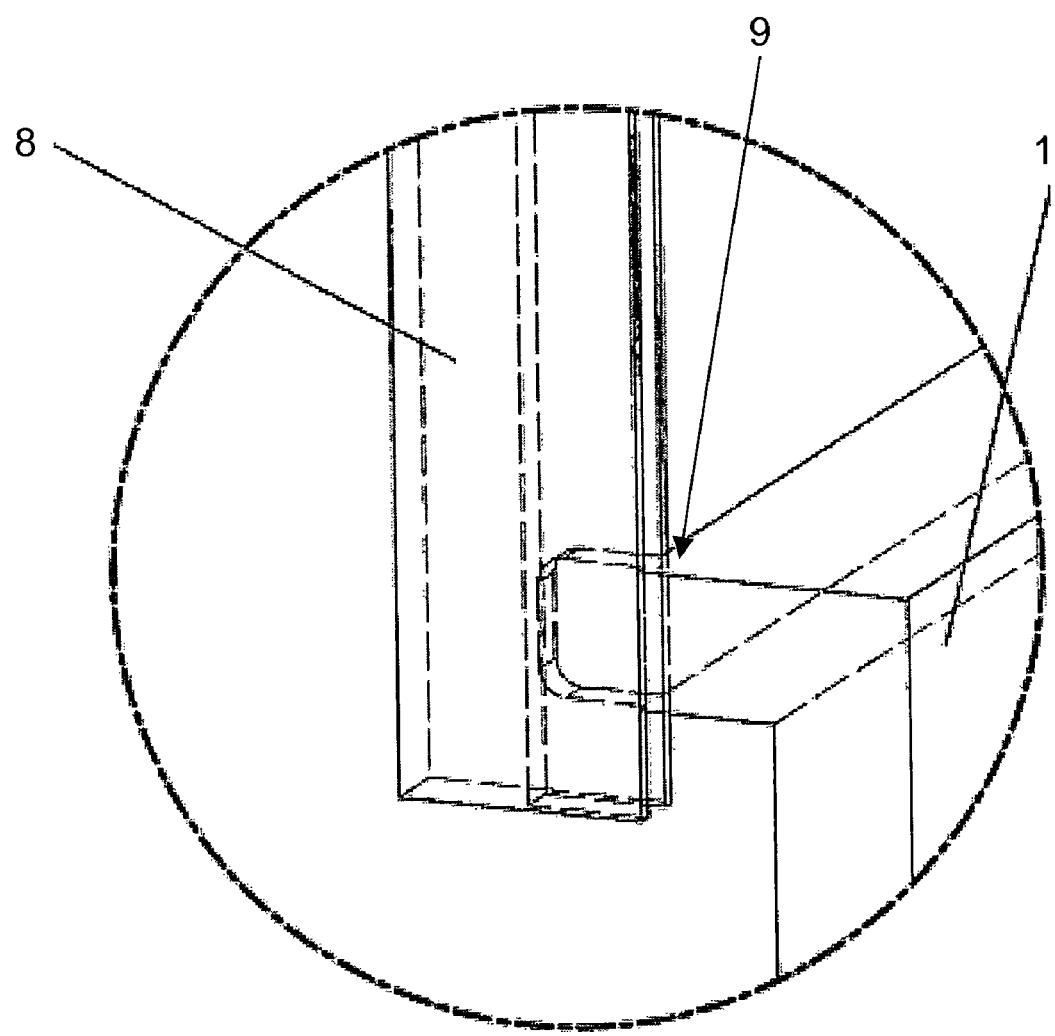
FIG. 5 a detailed view of a displacement device.

FIG. 5 shows a diagrammatic view of a displacement mechanism according to an exemplary embodiment of the present invention. In this arrangement the aisle 1 comprises a first guide element and/or a second guide element, wherein at least the first guide element 9 is in a guide rail 8. The diagram shows that the guide elements 9 can move along the guide rail 8 so that the aircraft passageway 1 can be vertically displaced. This provides a simple mechanism by means of which weight-saving suspension of the aircraft floor becomes possible.

To this effect, the guide elements are moved by means of a corresponding drive 100, 101 (FIG. 1). The drives 100, 101 (FIG. 1) is, for example, an electric motor, if need be in combination with a corresponding pneumatic system. Of course, other drives are also possible, such as for example telescopic legs or the like, that are operated by means of compressed air of fluid. A manually operated mechanism (e.g. with a crank) can be provided as an emergency system.

It should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A vertically movable passageway for a space in the ceiling region in an aircraft cabin, the passageway comprising:
   a passageway floor; and
   a displacement device comprising:
      a first guide element;
      a second guide element; and
      a vertical guide rail;
   wherein the displacement device is configured to variably set the height of the passageway floor between an upper position and a lower position;
   wherein at least one of the first guide element and the second guide element is firmly connected to the passageway floor; and
   wherein the first guide element is movable along the guide rail in a vertical direction, thereby moving the passageway floor in the vertical direction;
   wherein in the lower position a headroom (h1) above the passageway floor is bigger than a second headroom (h2) above a middle isle of the passenger cabin and below the passageway floor; and
   wherein in the upper position the first headroom (h1) is smaller than the second headroom (h2).

2. The passageway of claim 1, wherein the guide rail is arranged perpendicular to the cabin floor.

3. The passageway of claim 2, further comprising:
   a drive unit for moving the first guide element and the second guide element along the guide rail.

4. The passageway of claim 1, wherein the guide rail is configured as a retainer for an upper deck in the ceiling region.

5. The passageway of claim 1, wherein the guide rail is attached to a primary structure of the aircraft.

6. The passageway of claim 1, further comprising:
   a first wall arrangement and a second wall arrangement,
   wherein the first wall arrangement and the second wall arrangement are attachable to the fuselage floor.

7. The passageway of claim 1, further comprising: a drive unit for moving the displacement device.

8. The passageway of claim 1, further comprising:
   a ladder element attachable to the passageway and arranged such that the passageway is connectable to a main cabin aisle that is situated underneath said passageway.

9. The passageway of claim 8, wherein the ladder element is retractable and extendable.

10. The passageway of claim 8, wherein the passageway is arranged such that the ceiling region can be reached from the main cabin aisle, and wherein the ceiling region is selected from the group consisting of stowage compartment areas, sleeping areas, lounge areas, children's play areas, gastronomy areas and bar areas.

11. A method for the variable setting of the height of the passageway floor of a passageway for a space in the ceiling region in an aircraft cabin, the method comprising:

setting a first height (h1) of the passageway floor by means of a displacement device;

wherein the first height provides adequate standing height above the passageway floor;

the passageway comprising:
 a passageway floor; and
 a displacement device comprising
  a first guide element;
  a second guide element; and
  a vertical guide rail;

wherein the displacement device is configured to variably set the height of the passageway floor;

wherein at least one of the first guide element and the second guide element is firmly connected to the passageway floor; and wherein the first guide element is movable along the guide rail in a vertical direction, thereby moving the passageway floor in the vertical direction;

wherein in the lower position a headroom (h1) above the passageway floor is bigger than a second headroom (h2) above a middle isle of the passenger cabin and below the passageway floor; and wherein in the upper position the first headroom (h1) is smaller than the second headroom (h2).

12. The method of claim 11, wherein setting the height comprises moving a first guide element or a second guide element together with the passageway floor along a guide rail.

13. The method of claim 11, further comprising setting a second height (h2) of the passageway floor by means of the displacement device;

wherein the second height (h2) provides adequate standing height underneath the passageway floor.

14. An aircraft with a vertically movable passageway for a space in the ceiling region in an aircraft cabin, the passageway comprising:

a passageway floor; and
a displacement device comprising:
 a first guide element;
 a second guide element; and
 a vertical guide rail;

wherein the displacement device variably sets the height of the passageway floor;

wherein at least one of the first guide element and the second guide element is firmly connected to the passageway floor; and wherein the first guide element is movable along the guide rail in a vertical direction, thereby moving the passageway floor in the vertical direction;

wherein in the lower position a headroom (h1) above the passageway floor is bigger than a second headroom (h2) above a middle isle of the passenger cabin and below the passageway floor; and wherein in the upper position the first headroom (h1) is smaller than the second headroom (h2).

\* \* \* \* \*